A. Moravek.
Corn Harvester.

Nº 61,852. Patented Feb. 5, 1867.

Witnesses:

Inventor:

United States Patent Office.

AUGUST MORAVEK, OF ROSNYO, HUNGARY.

Letters Patent No. 61,852, dated February 5, 1867.

---

IMPROVEMENT IN CORN-HARVESTERS.

---

The Schedule referred to in these Letters Patent and making part of the same.

---

TO ALL WHOM IT MAY CONCERN:

Be it known that I, AUGUST MORAVEK, of Rosnyo, in the county of Gömör, Hungary, have invented a new and improved Corn-Harvester; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention relates to a new and improved machine for harvesting maize or Indian corn; and it consists in a cutting device, endless elevating apron, and a discharging platform, all arranged and applied to a wagon, to operate in the manner substantially as hereinafter fully shown and described.

Figure 1:
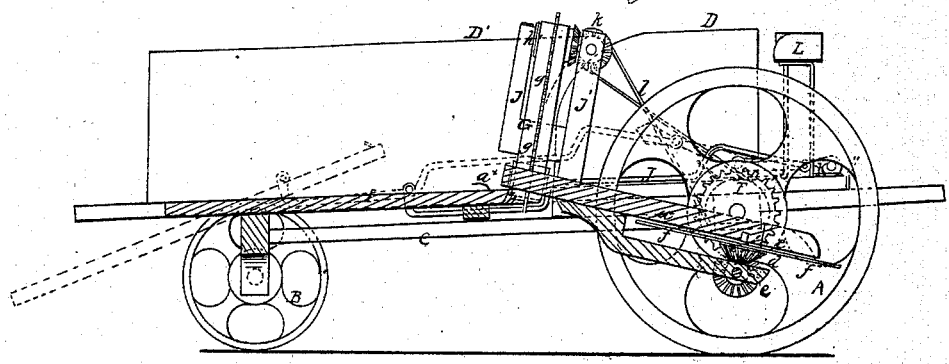
Figure 1 is a side sectional view of my invention, taken in the line $x\ x$, fig. 2.
Figure 2:
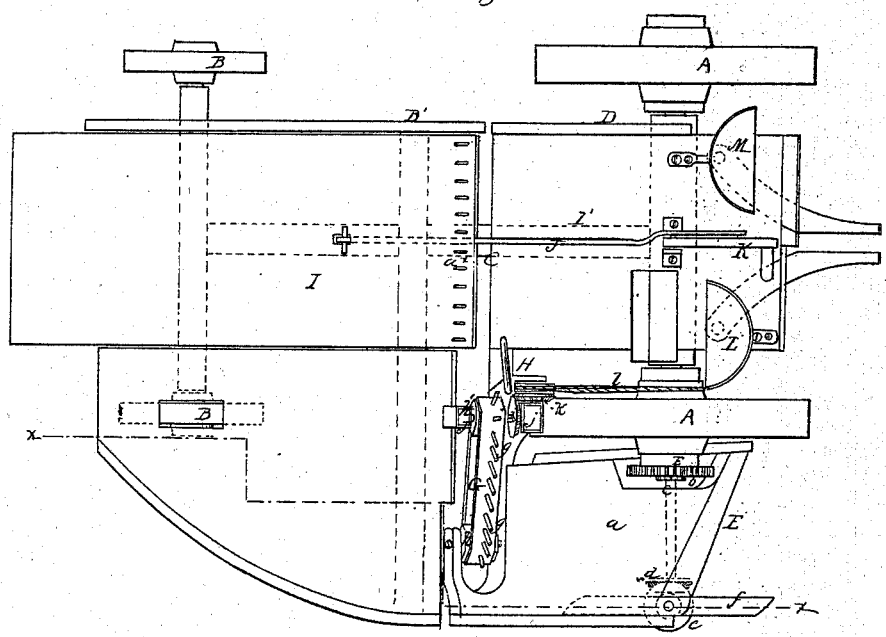
Figure 2 is a plan or top view of the same.

A represents the front and B the hind wheels of a wagon, the front and rear axles being connected by a reach or perch, C. The body of the wagon is composed of two parts, D D', the front part, D, being connected with the front axle, and the rear part, D', connected with the rear axle and perch or reach. The right-hand side of the rear part D' of the wagon body gradually curves inward from its front to its rear end, so that the rear end is much narrower than the front end, as shown clearly in fig. 2. The bottom $a$ of the right-hand side of the front part D of the wagon body has an oblique position, and a knife or cutter, E, attached, the knife or cutter having an oblique position corresponding to the body $a$, to which it is attached, as shown in fig. 2, the knife or cutter receding or extending backward from its inner to its outer end, so that the end of the knife or cutter nearest the right-hand wheel A will be considerably in advance of the opposite end. This portion of the front part D of the wagon body, to which the knife or cutter E is attached, is at the right-hand side of the right front wheel A, and to the outer end of the hub of said wheel there is attached a toothed wheel, F, which gears into a pinion, $b$, on a shaft, $c$, underneath the bottom $a$, said shaft $c$ having a bevel-wheel, $d$, on its outer end, which gears into a corresponding wheel, $e$, on the axis of which there are two cutters, $ff$, which work underneath the stationary or fixed knife or cutter E, a rotary motion being given to the cutters $ff$ by means of the gearing described. G represents an endless elevating apron, provided with teeth, $g$, and working around a pulley, $h$, at the rear end of the front part D of the wagon body, and around the pulley $h'$ on a shaft, $i'$, the bearings of which are in the upper ends of uprights, $j$, at the rear part of D, and in line with the right wheel A. This elevating apron is driven by gears $k$, motion to which is communicated by a band, $l$, from the hub of the right-hand wheel A. H is an upright rod attached to the rear of the part D, and extending up above the elevated part of the apron, the upper part of said rod being curved. The portion I of the bottom of the rear part of the body D' is movable, said portion I being in line with the portion I' of the bottom of the front part D of the body which is between the front wheels A A. This movable portion I is connected by a rod, J, with a lever, K, secured to I', and by actuating the lever K the portion I may be moved forward and backward, and when moved backward to its fullest extent it will tilt or dump, as shown in red outline in fig. 1, and discharge its load. As the machine is drawn along, the standing corn-stalks are severed by the stationary knife or cutter E and the rotary cutters $ff$, the obliquity of the knife or cutter E insuring an easy cut. The cut stalks fall back within the body of the wagon, the top or tassel ends being thrown towards the movable portion I of the bottom of the wagon by the curved right-hand side of the rear part D' of the body. The endless elevator G carries the buts of the stalks over the right-hand front wheel A, and the cut stalks are deposited upon the movable portion I of the bottom of the wagon body. An attendant on a seat, L, by means of a fork prevents the entanglement of the stalks, and the rod H serves as a guide to the stalks as they pass off from the upper part of the elevating apron, and detaches the stalks from the teeth of the apron. When a requisite quantity of stalks has been deposited upon the movable part I of the bottom of the wagon body, the driver on seat M actuates the lever K and throws back I, so that it will tilt or dump and discharge its load. The movable portion I of the bottom of the wagon body is provided with teeth, $a^{\times}$, to insure the movement of the stalks with I.

Having thus described my invention, what I claim as new, and desire to secure by Letters Patent, is—

I claim the movable portion I of the bottom of the wagon body, in combination with the endless elevating apron G, stationary cutter E, and rotary cutters $ff$, all arranged to operate substantially as shown and described.

The above specification of my invention signed by me this 3d day of March, 1866.

AUGUST MORAVEK.

Witnesses:
Dr. TREMKO MÁTÉ,
Dr. MADARASZ RUDOLF.